(12) United States Patent
Yamamoto

(10) Patent No.: US 6,731,865 B1
(45) Date of Patent: May 4, 2004

(54) RECORDING/PLAYBACK APPARATUS AND METHOD CAPABLE OF MODIFYING THE NUMBER OF RETRY OPERATIONS

(75) Inventor: Noriyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/438,353

(22) Filed: Nov. 11, 1999

(30) Foreign Application Priority Data

Nov. 11, 1998 (JP) .......................................... 10-320330

(51) Int. Cl.⁷ .............................................. H04N 5/781
(52) U.S. Cl. ...................................... 386/125; 386/126
(58) Field of Search ....................... 386/70, 45, 20–21, 386/40, 124, 113, 125–126; 360/27, 32, 40, 48

(56) References Cited

U.S. PATENT DOCUMENTS 5,019,920 A * 5/1991 Yoshimoto et al. ............. 360/27
5,341,360 A * 8/1994 Johann et al. ............ 369/47.53
5,394,537 A * 2/1995 Courts et al. ................ 711/202
5,513,166 A * 4/1996 Tokumitsu et al. ....... 369/53.15
5,856,930 A * 1/1999 Hosono ....................... 345/719
6,539,164 B2 * 3/2003 Shirakawa et al. ........... 386/70

* cited by examiner

Primary Examiner—Chris Kelley
Assistant Examiner—Jamie Vent
(74) Attorney, Agent, or Firm—Frommer Lawrence & Haug LLP; William S. Frommer; Gordon Kessler

(57) ABSTRACT

A recording/playback apparatus, includes a supplying device for supplying continuous data at a predetermined transfer rate. A recording device having a certain seek performance and recording mode records the continuous data on the recording medium in a recording unit, and a first setting device sets the size of the recording unit according to the transfer rate of the supplied continuous data or the seek performance of the recording device or the recording mode. The recording device includes a designating device for designating the transfer rate according to the recording mode. The apparatus further comprises a second setting device for setting the number of allowable retries to play back data from said recording medium according to the transfer rate or the seek performance or the recording unit size.

29 Claims, 9 Drawing Sheets

F I G. 1
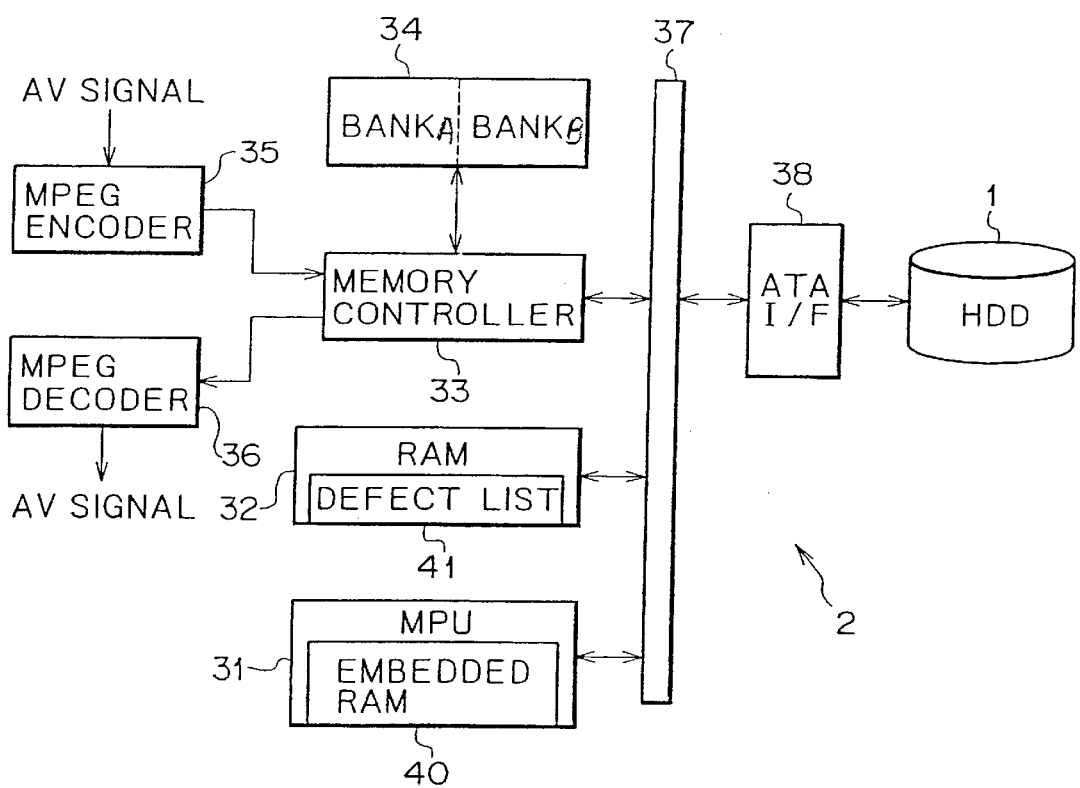

RECORDING/PLAYBACK APPARATUS AND METHOD CAPABLE OF MODIFYING THE NUMBER OF RETRY OPERATIONS

BACKGROUND OF THE INVENTION

This invention relates to a recording/playback apparatus, a recording/playback method and a presentation medium. In particular, the present invention relates to a recording/playback apparatus capable of recording and playing back data with a high degree of efficiency by modifying the number of retries.

Data recorded or played back by a hard disc drive (abbreviated hereafter to an HDD) is controlled by a file v management function of an operating system (abbreviated hereafter to an OS) which runs on a host computer. For example, the HDD is not aware of a location or a free area into which data is to be recorded, so that, in a recording operation, data is written into a location specified by the host computer. In a playback operation, on the other hand, data recorded on a disc is read out from a location specified by the host computer.

In the case of such an OS as MS-DOS™ and UNIX™, a recording area of a disc is divided into data blocks or sectors each having a fixed size of 512 or 1,024 bytes during initialization. Data is recorded in data-block units. This method is referred to as a fixed-size division method.

In the case of the fixed-size division method, when a disc is initialized, a sector specific number, which is also referred to as a sector ID, is written into the beginning of a sector. A sector ID represents a physical location on a disc. Typically, a sector ID comprises an 8-bit sector number, a 16-bit track number, an 8-bit surface number and a 16-bit error-inspection code which is referred to hereafter as a CRC (Cyclic Redundancy Check) code.

The host computer controls sector IDs as a series of logical block addresses (LBAs). In an operation to record data, the host computer specifies an LBA representing a physical location on the disc into which the data is to be written.

FIG. 10 is a block diagram showing a typical configuration of the related art HDD. Assume that MS-DOS is used as an OS in this typical configuration. In the HDD 1, a microprocessor unit (abbreviated hereafter to an MPU, Micro Processing Unit) 11 controls all functions of the HDD 1. A servo circuit 12 generates a driving signal for controlling a voice coil motor (abbreviated hereafter to VCM) 13. The VCM 13 moves a magnetic head (not shown) to a predetermined track position on a disc 18. A buffer 16 is used for storing data received from an external source and data to be supplied to an external destination. A read/write channel processing unit 17 carries out processing to generate a signal to be recorded onto the disc 18 and processing to play back a signal read out from the disc 18. Controlled by the MPU 11, a hard-disc controller (abbreviated hereafter to an HDC) 15 controls operations to write and read out data into and from the buffer 16 and exchanges data with the R/W channel processing unit 17. The MPU 11, the servo circuit 12, the HDC 15 and the R/W channel processing unit 17 are connected to each other by an MPU bus 14.

ECCs (Error Correction Codes) are added to data to be recorded onto the disc 18. When an ECC error is detected for a sector in an operation to play back data from the sector, the MPU 11 issues a command to repeat the operation to read out data from the sector. This repeated operation is called as a retry. In an ordinary HDD, a number of retries are allowed and performed internally.

In a case where data can not be read out correctly from a sector, even if a number of allowable retries have been carried out, the MPU 11 treats the sector as a defective sector. In a following operation to write data into a defective sector, the data is written into a sector in an alternate area. This is called alternative-sector processing.

The HDD 1 is connected to the host computer 2 by a bus, such as an SCSI (Small Computer System Interface) bus or an IDE (Intelligent Drive Electronics) bus.

In the host computer 2, MS-DOS is used as an OS 21. A disc driver 22 is a program which allows the disc 18 to be accessed as a block device. A logical format program 23 is a program for writing necessary initialization information such as sector IDs and a file management table during initialization of the disc 18. Linked to the device driver 22 and the logical format program 23, a BIOS (Basic Input Output System) 24 renders I/O (Input/Output) services for inputting and outputting data from and to the HDD 1. The BIOS 24 can be regarded as a collection of routine programs dependent on hardware.

When data having a high rate such as AV (audio/video) data is recorded or edited on the HDD 1 in logical block units, the continuous data is scattered over the disc into small pieces of data. The scattering of data is known as fragmentation. When fragmented data is read out from a disc, the read operation frequently enters a wait state due to head seeks and disk revolutions to read target positions, breaking the continuity of the output data.

In order to solve this problem, data is recorded not in logical block units, but in cluster units each comprising several block units. Typically, the size of a cluster unit is 1,024 sectors. The size of a cluster unit is set at such a value that the continuity of output data in a playback operation is sustained, even if the data recorded on the disc is fragmented into cluster units.

The size of a cluster is made uniform for all data types in order to make operations to write and read out data easy to control. Typically, the size of a cluster is set at an extremely small value which is obtained with regular data such as text data taken as a reference. If the size of a cluster is too small, however, data recorded on the disc is prone to fragmentation described above. If a small amount of data is recorded in large cluster units, an excessively large recording area will be wasted.

The size of a cluster can also be determined from a simple proportional relation with a reference data transfer rate or an assumed transfer-channel count. In this case, however, the size of a cluster is not optimum. In addition, the type of data and the number of transfer channels are not reflected in an upper limit of the number of retries that can be carried out in the event of an error detected in a data recording or playback operation. As a result, the transfer rate is not guaranteed for data with a strict continuity requirement such as AV data.

OBJECTS OF THE INVENTION

It is thus an object of the present invention to provide a recording/playback apparatus and a recording/playback method wherein the number of retry operations is determined in accordance with the size of each of units in which data is written and/or read out so that the data can be recorded and/or played back with a high degree of efficiency without losing data continuity.

SUMMARY OF THE INVENTION

In order to attain the above objects, according to a first aspect of the present invention, there is provided recording/ playback apparatus, a recording/playback method and a presentation medium. The apparatus comprises a supplying device for supplying the continuous data at a predetermined transfer rate, a recording device having a certain seek performance and recording mode for recording the continuous data on the recording medium in recording unit, and a first setting device for setting the size of the recording unit according to the transfer rate of the supplied continuous data. The first setting device sets the size of the recording unit according to the seek performance of the recording device. The recording device includes a designating device for designating the transfer rate according to recording mode. The first setting device includes a device for setting the recording unit size according to the recording mode. The apparatus further comprises a second setting device for setting the number of allowable retries according to the transfer rate. The apparatus further comprises a second setting device for setting the number of allowable retries according to the seek performance. The apparatus further comprises a second setting device for setting the number of allowable retries according to the recording unit size.

BRIEF DESCRIPTION OF THE DRAWINGS

For a more complete understanding of the invention, reference is made to the following description and accompanying drawings, in which:

FIG. 1 is a block diagram showing a typical configuration of a host computer to which the present invention is applied;

DESCRIPTION OF THE PREFERRED EMBODIMENTS

Figure 2:
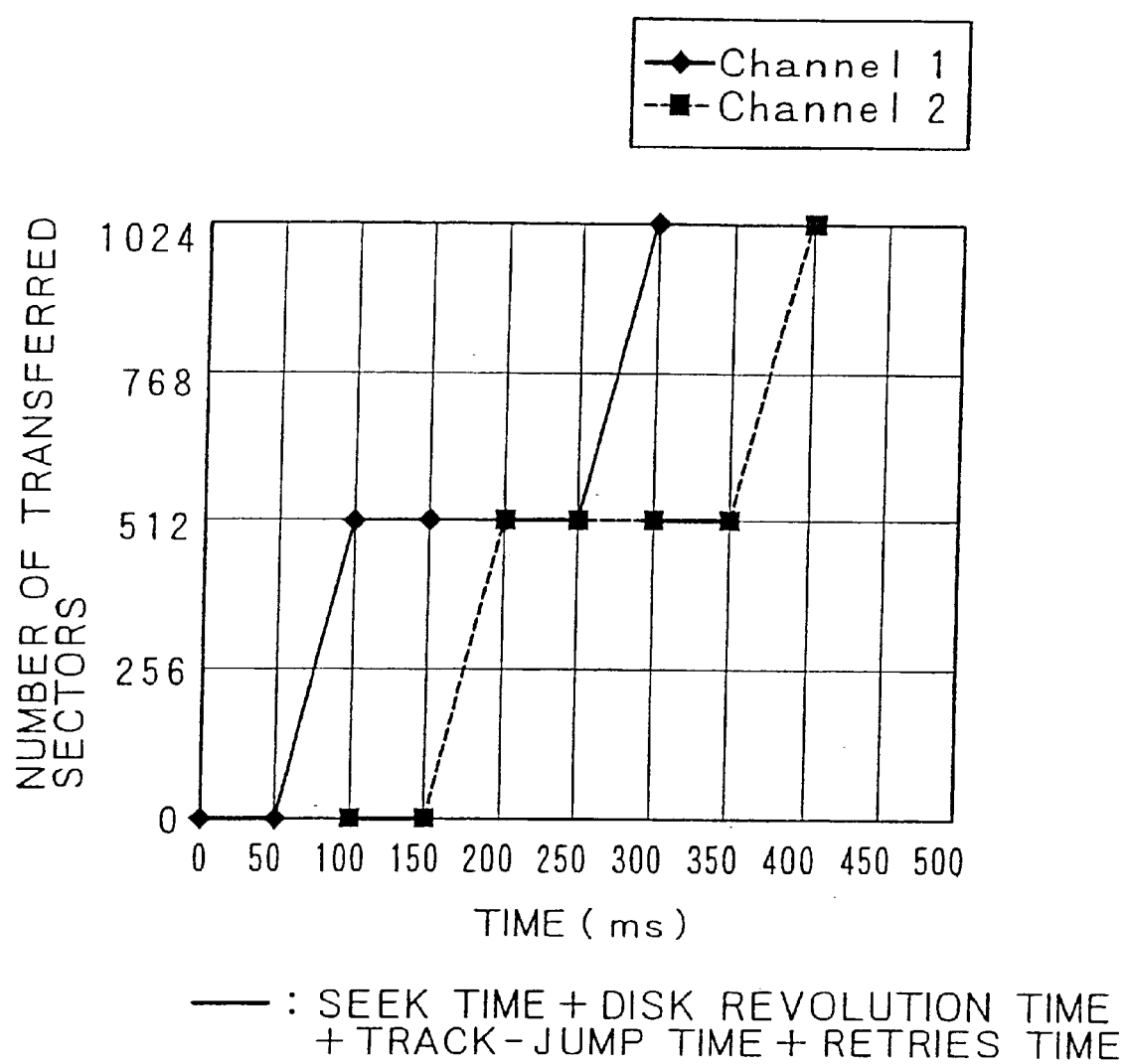
FIG. 2 is a diagram showing the state of a transfer of AV data from a HDD to a host computer.

The following is a detailed description of embodiments of the present invention with reference to the drawings. FIG. 1 is a block diagram showing a typical configuration of a host computer 1 to which the present invention is applied. It should be noted that recorded or playback data is AV data conforming to the MPEG (Moving Picture Experts Group) system.

An MPU 31 employed in the host computer 2 controls and coordinates all operations as well as executes file management of user data. The MPU 31 includes an embedded RAM (Random-Access Memory) 40 for storing data to be used temporarily such as a table showing newly found defective recording areas as well as necessary information on file management. On the other hand, a host RAM 32 is used for storing data such as a file-management table including a defect list 41 used in defect processing.

A memory controller 33 controls operations to input AV data from an MPEG encoder 35 and output AV data to an MPEG encoder 36 in order to implement simultaneous recording and playback operations. The memory controller 33 also is connected to an ATA (AT Attachment) I/F 38 by way of a data bus 37, for controlling interface operations to input and output data from and to a buffer 34.

The buffer 34 comprising two banks A and B is used for temporarily storing data input and output to and from the host computer 2. For example, data read out from the bank A is supplied to the HDD 1, while at the same time, data supplied by the MPEG encoder 35 is stored in the bank B. As these two simultaneous operations are completed, the HDD 1 is switched from the bank A to the bank B, consequently, the MPEG encoder 35 is switched from the bank B to the bank A. Thus, data read out from the bank B is now supplied to the HDD 1, while at the same time, data supplied by the MPEG encoder 35 is now stored in bank A.

The MPEG encoder 35 receives an AV signal from an external host such as a television receiver not shown in the figure, encoding video and audio signals individually in accordance with the MPEG format, and then multiplexes the signals before supplying them to the memory controller 33. In the MPEG decoder 36, video data and audio data are separated from each other by a demultiplexer (not shown) before each is decoded. The MPU 31, the host RAM 32, the memory controller 33 and the ATA I/F 38 are connected to the data bus 37.

Figure 10:
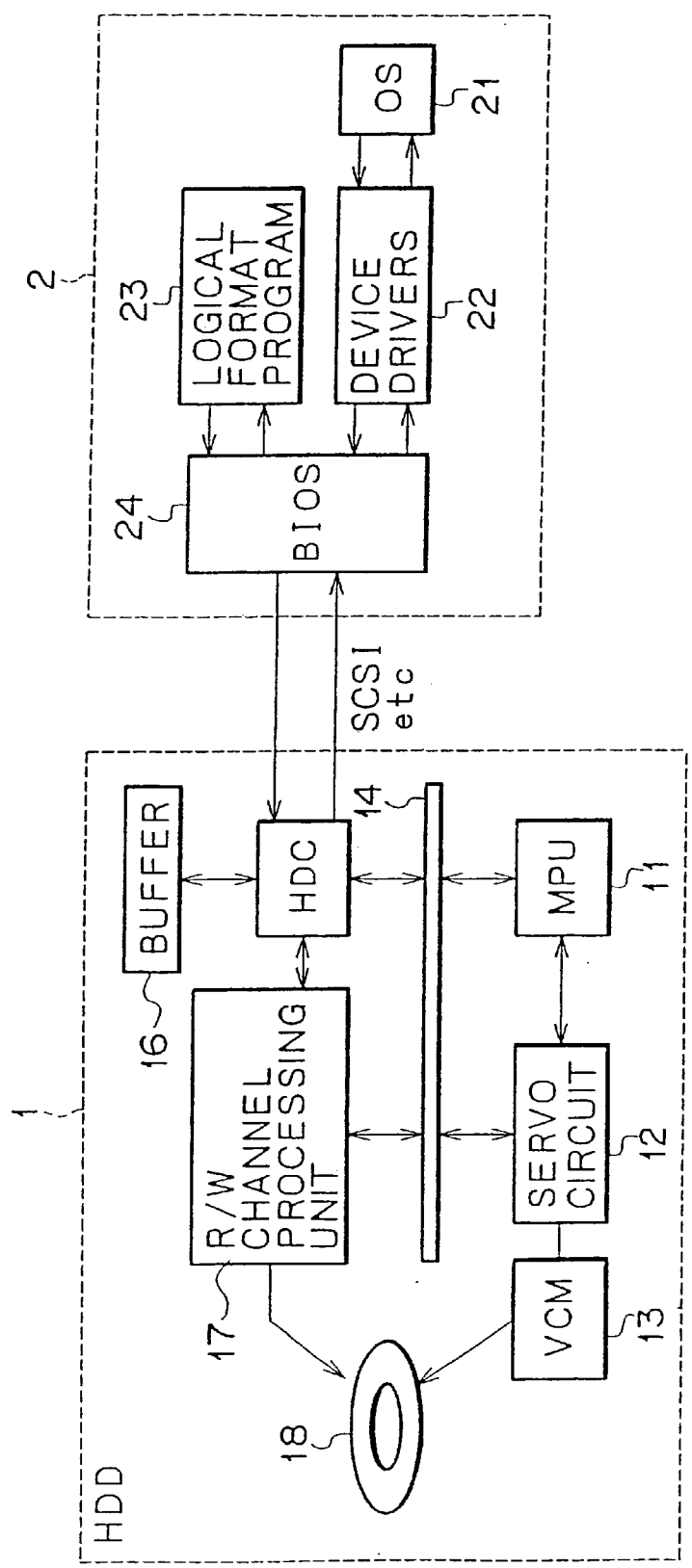
FIG. 10 is a block diagram showing a typical configuration of the related art recording/playback apparatus.

The ATA I/F 38 serves as an interface between the HDD 1 and the host computer 2 through the data bus 37. The functions of the HDD 1 are the same as what have been described earlier by referring to FIG. 10.

Next, basic operations of the host computer 2 are explained. An AV signal received from an external host not shown in the figure such as a television receiver is supplied to the MPEG encoder 35. The MPEG encoder 35 encodes video and audio signals individually in accordance with the MPEG system, and then multiplexes the signals by using an incorporated multiplexer (not shown) before supplying them to the memory controller 33. The memory controller 33 outputs the AV data to the buffer 34 to be stored therein temporarily. The MPU 31 controls the memory controller 33 to read out the AV data back from the buffer 34 by fixed units and outputs the data to the HDD 1 to be recorded therein.

In a playback operation, on the other hand, the MPU 31 gives a command to the memory controller 33 to read out AV data of a predetermined amount from the HDD 1 and store the AV data into the buffer 34. Receiving the command, the memory controller 33 reads out AV data of a predetermined amount from the HDD 1 and stores the AV data into the buffer 34 temporarily. The AV data read out by the memory controller 33 is supplied to the MPEG decoder 36. The MPEG decoder 36 separates the AV data received from the buffer 34 into video data and audio data, decodes the video and audio data separately and outputs them as an AV signal.

FIG. 2 is a diagram showing a relation between the amount of transferred data in sectors and the lapse of time in an operation to transfer AV data of 2 channels encoded in accordance with the MPEG from the HDD 1 to the host computer 2. The AV data is transferred at a transfer rate of eight Mbps. In the case where the number of pictures (N) is 15 and the appearance frequency of I- and P-pictures is 3, the size of GOP (Group of Pictures) data is 512 KB (1,024 sectors). Assuming that the cluster size is 256 KB (512 sectors), a GOP comprises two clusters.

Data of channel 1 is read out from its first cluster after completing a seek operation by the magnetic head, a time to wait for the disc to rotate to a desired position and a track jump, those to be done within the first 50-ms period of time. During the following 50-ms period of time, the data of channel 1 is transferred to the host computer 2. During the third and fourth 50-ms periods of time, the data of channel 2 is read out from its first cluster and transferred to the host computer 2, so that the operation to read out and transfer the data of channel 1 is temporarily suspended. Then, at the beginning of the fifth 50-ms period of time, the operation to read out and transfer the data of channel 1 is resumed from its second cluster and, at the end of the sixth 50-ms period of time, the operation to read out and transfer the data of channel 1 from its first and second clusters (=2×512 sectors) is ended. Likewise, during the fifth and sixth 50-ms periods of time, the operation to read out and transfer the data of channel 2 is suspended temporarily. Similarly, at the beginning of the seventh 50-ms period of time, the operation to read out and transfer the data of channel 2 is resumed from its second cluster and, at the end of the eighth 50-ms period of time, the operation to read out the data of channel 2 from its first and second clusters (=2×512 sectors) is ended.

In order to sustain the continuity of a data transfer, the following conditional relation must be satisfied:

$$\text{(HDD internal transfer rate)} \times \text{(Transfer allowable time)} \text{ (Required amount of transferred data} \ldots \quad (1)$$

The total number of transfers (m) required to transfer one GOP is m=GOP/cluster size. In the case of the example shown in FIG. 2, m=1,024 sectors/512 sectors=2. That is to say, in order to transfer AV data of one GOP (=1,024 sectors) which is recorded in 2 clusters each having a size of 512 sectors, twice of transfers are required.

The above formula can be expressed in terms of actual parameters as follows:

$$(e \times RDRV) \times (TGOP/(n \times m) - (TSEEK + TREV)) \; RMPEG \times TGOP/m \ldots \quad (2)$$

where:
n is the number of recording or playback channels,
e is a format efficiency,
TGOP is a GOP time (sec),
RMPEG is an MPEG transfer rate (Mbps),
TSEEK is a maximum seek time (sec),
TREV is a disc revolution time (sec) and
RDRV is an internal transfer rate in the HDD (Mbps).

In the above formula, a worst fragmentation state is taken into consideration. In a worst fragmentation state, a wait time comprising a head seek time and a disc revolution time is entailed each time an access is made to a cluster in which data is recorded. It should be noted that the above formula does not consider a time to carry out retry processing in the event of an error detected during an operation to read out data and defect processing after the retry processing.

The size of one GOP is expressed as follows:
GOP (Mbit)=RMPEG×TGOP

Since one GOP comprises m clusters, the size of a cluster is expressed as follows:

$$\text{Cluster (Mbit)} = \text{GOP (Mbit)}/m = RMPEG \times TGOP/m \ldots \quad (2a)$$

By rearranging formula (2), TGOP can be found as follows:

$$TGOP \; (TSEEK+TREV) \times e \times RDRV \times n \times m/(e \times RDRV - n \times RMPEG) \ldots \quad (2b)$$

It should be noted that formula (2b) is derived by normal algebraic manipulation of formula (2), details of which are omitted. By substituting the expression on the right-hand side of formula (2b) for TGOP in equation (2a), the size of a cluster is expressed as follows:
Cluster (Mbit)

$$RMPEG \times (TSEEK+TREV) \times e \times RDRV \times n/(e \times RDRV - n \times RMPEG) = (TSEEK+TREV)/(e \times RDRV - n \times RMPEG)/(e \times RDRV \times n \times RMPEG) = (TSEEK+TREV)/\{1/(n \times RMPEG) - 1/(e \times RDRV)\}$$

Thus, Cluster (Mbit) (TSEEK+TREV)/$\{1/(n \times RMPEG) - 1/(e \times RDRV)\}$

Since one Mbit=1,024/8 kbyte=128 kbyte, Cluster (kbyte)=128×cluster (Mbit). Thus,
Cluster (kbyte)

$$128 \times (TSEEK+TREV)/\{1/(n \times RMPEG) - 1/(e \times RDRV)\} \ldots \quad (3)$$

As described above, a wait time comprising a head seek time and a disc revolution time is entailed each time an access is made to a cluster in which data is recorded. Now, in addition to the head seek time and the disc revolution time, consider a time to carry out retry processing in the event of an error detected in an operation to read out data. In this case, the size of a cluster is expressed as follows:
Cluster (kbyte)

$$128 \times (TSEEK+(1+NRTRY) \times TREV)/\{1/(n \times RMPEG) - 1/(e \times RDRV)\} \ldots \quad (4)$$

where NRTRY is the number of retries. As shown in formula (4), the size of the cluster is found in the same way as formula (3) except that the retry processing has an effect of lengthening the disc revolution time TREV by (1+NRTRY) times.

The formula for finding the size of a cluster from the upper limit NRTRY of the number of retries with the retry processing taken into consideration can be simplified as follows:
Cluster (kbyte)

$$(3+NRTRY)/\{3/(4 \times n \times RMPEG) - 1/RDRV\} \ldots \quad (5)$$

The above simplified formula is obtained for a 3.5-inch ATA HDD, a disc revolution speed of 5,400 RPM, a TSEEK value of 0.02 sec, a TREV value of 0.01 sec and a format efficiency e of 0.78 which is a realistic value.

Conversely, by rearranging formula (4), the number of allowable retries NRTRY can be found from a given cluster size as follows:
NRTRY $$\text{Cluster} \times \{1/(n \times RMPEG) - 1/(e \times RDRV)\}/(128 \times TREV)TSEEK/TREV - 1 \ldots \quad (6)$$

At the beginning of a data transfer, the MPU 31 computes the number of allowable retries from the number of channels specified in a transfer request by using the above formula.

Figure 3:
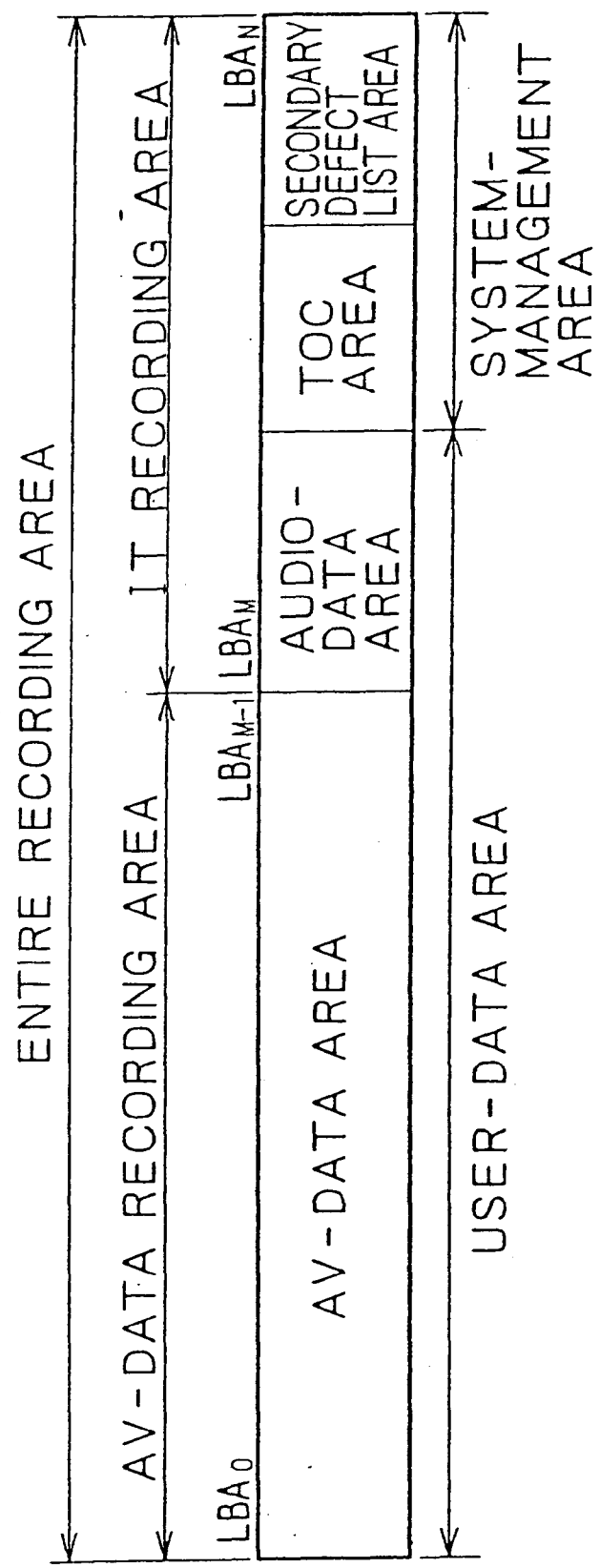
FIG. 3 is a diagram showing a typical structure of a data management format of a recording area in the HDD.

FIG. 3 is a diagram showing a typical structure of a data management format of a recording area in the HDD 1. As shown in the figure, the entire recording area of the disc 18 in the HDD 1 is controlled by using consecutive LBAs, namely, from LBA0 to LBAN.

LBA0 to LBAM-1 are used for recording AV data whereas the remaining LBAM to LBAN are used for recording an IT (Information Technology) data. The IT recording area comprises an audio-data area, a TOC (Table of Contents) area and a secondary-defect-list area. The AV-data recording area and the audio-data area constitute an area in which user data can be recorded. On the other hand, the TOC area and the secondary-defect-list area are referred to as a system-management area.

AV data is recorded in cluster units in dependence on a recording mode of the system. The recording bit rate varies from mode to mode. In an edit mode for recording editable data, the recording bit rate is typically eight Mbps. An SP mode for recording video data of a relatively high quality at a typical recording bit rate of 4 Mbps is inferior to the edit mode. An LP mode with a recording bit rate of typically 2 Mbps is used for recording video data over a long period of time, although the quality of which is not that high. A cluster is a collection of a plurality of logical blocks. A cluster is a smallest data recording unit on a disc. The size of a cluster varies in dependence on the recording mode and can be found by using computation formula (4) or (5) given above.

Figure 4:
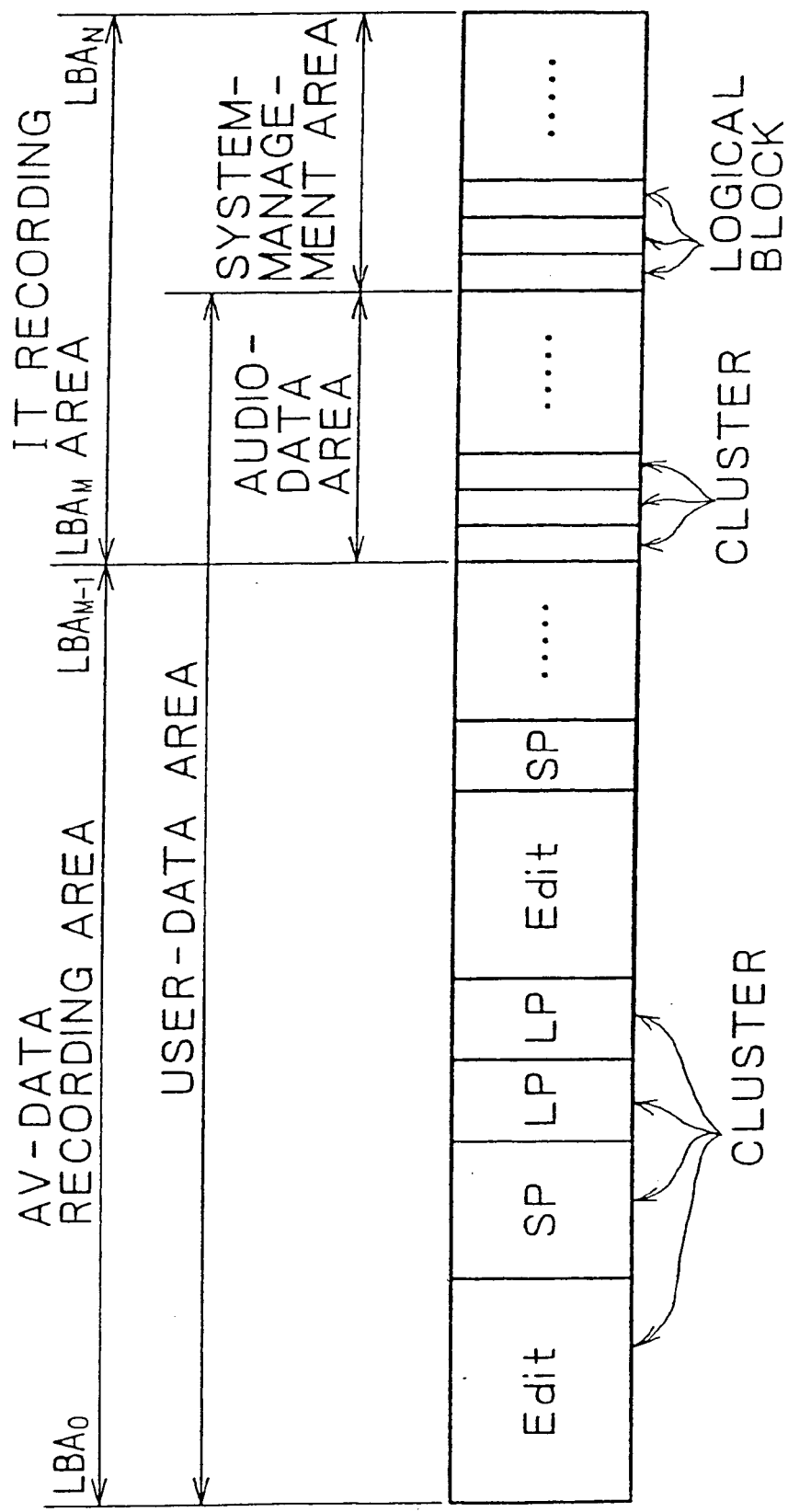
FIG. 4 is a diagram showing a layout of clusters of AV data with sizes varying in dependence on the recording mode.

FIG. 4 is a diagram showing a layout of clusters of user data and system-management data to be recorded. As shown in the figure, the size of a cluster of user data which can be video or audio data varies in accordance with the recording mode and is found by using computation formula (4) or (5) given above. It should be noted that data is recorded into the system-management area in logical-block units. A file unit of AV data is referred to as a title.

Figure 5:
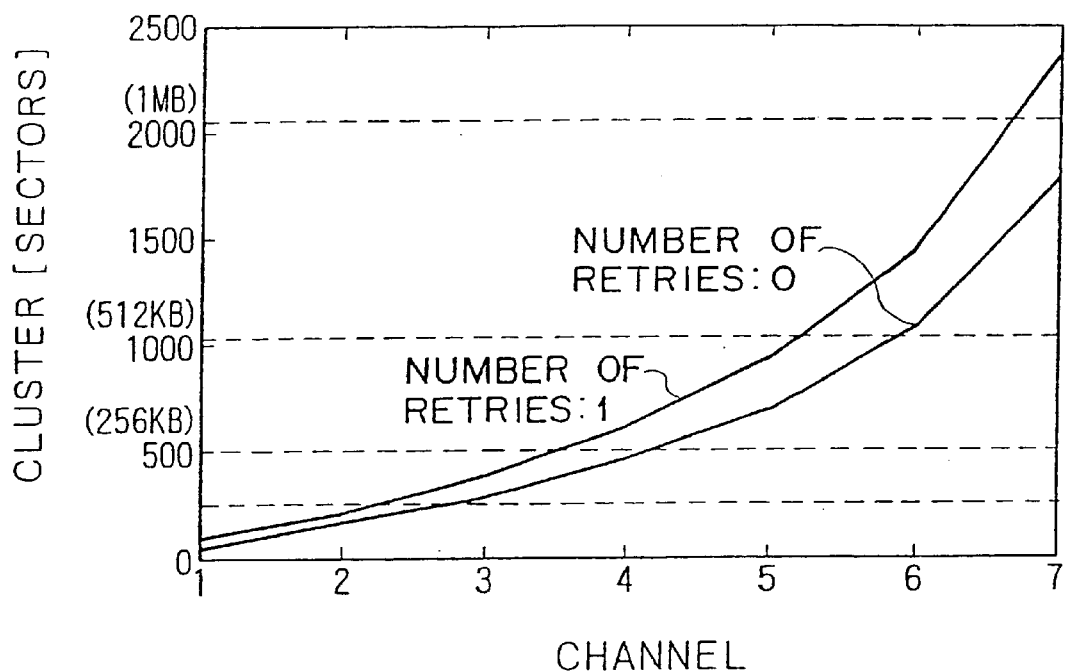
FIG. 5 is a diagram showing relations between the number of channels to be transferred and the cluster size of transferred data with the number of allowable retries taken as a parameter.

FIG. 5 is a diagram showing relations between the number of channels and the cluster size of transferred data with the number of allowable retries taken as a parameter. To be more specific, the diagram shows relations for allowable-retry counts of zero and one for writing attempt. As shown it the figure, the size of a cluster for an allowable-retry count of 0 can be made smaller than that of an allowable-retry count of 1 as is also obvious from formula (4) or (5). In addition, the size of a cluster also increases for a larger number of channels as is obvious from formulas (3), (4) and (5).

Figure 6:
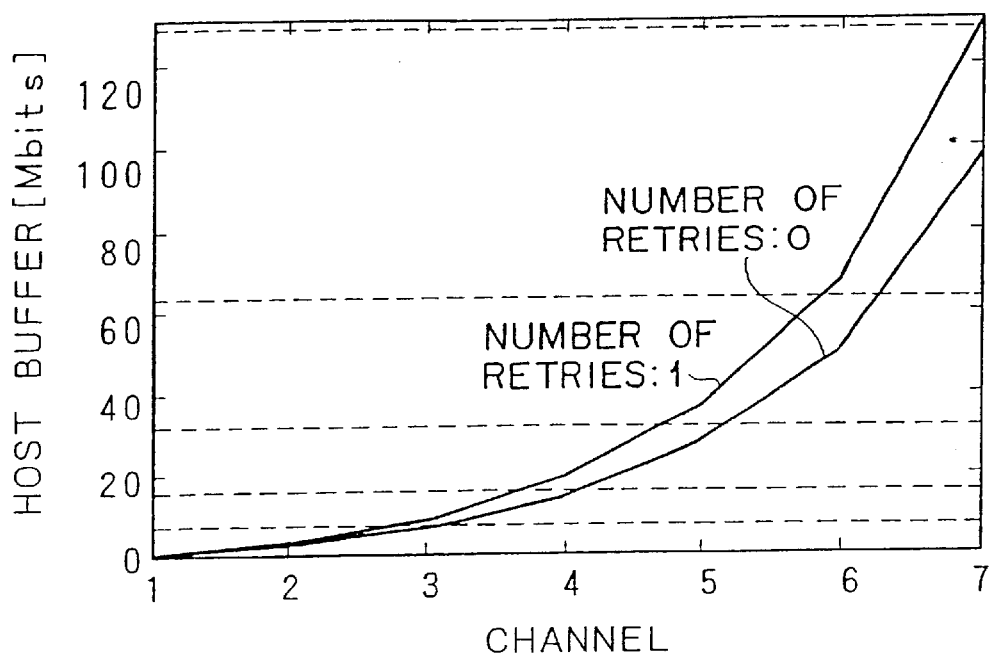
FIG. 6 is a diagram showing relations between the number of channels and the required size of a buffer with the number of allowable retries taken as a parameter.

FIG. 6 is a diagram showing relations between the number of transfer channels and the required size of the buffer 34 with the number of allowable retries taken as a parameter. To be more specific, the diagram shows relations for allowable-retry counts of zero and one for writing attempt. As shown in the figure, the size of the buffer 34 for an allowable-retry count of zero can be made smaller than that of an allowable-retry count of one. In addition, the required size of the buffer also increases for a larger number of channels.

Figure 7:
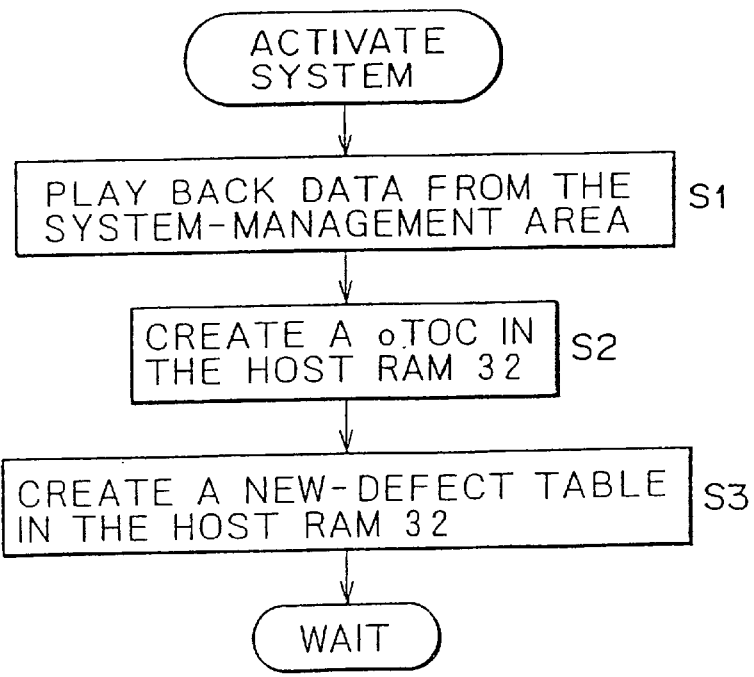
FIG. 7 shows a flowchart representing processing to play back data from a system-management area when a host computer is activated.

The following description explains processing to play back data from the system-management area when the host computer 2 is activated with reference to a flowchart shown in FIG. 7. As shown in the figure, the flowchart begins with a step Si at which the MPU 31 reads out information in the TOC area and information in the secondary-defect list area from the system-management area. The information recorded in the TOC area on the HDD 1 is referred to hereafter as dTOC information. The flow of the processing then goes on to a step S2 at which the MPU 31 writes the information of the TOC area read out at the step S1 at an predetermined address in the host RAM 32, creating 0TOC information. 0TOC information is TOC information written into the host RAM 32. Then, the flow of the processing goes on to a step S3 at which the MPU 31 writes the information of the secondary-defect list area read out at the step S1 at a predetermined address in the host RAM 32, creating a new-defect table. When the processing of the step S3 is completed, the host computer 2 enters a state to wait for a next instruction.

Figure 8:
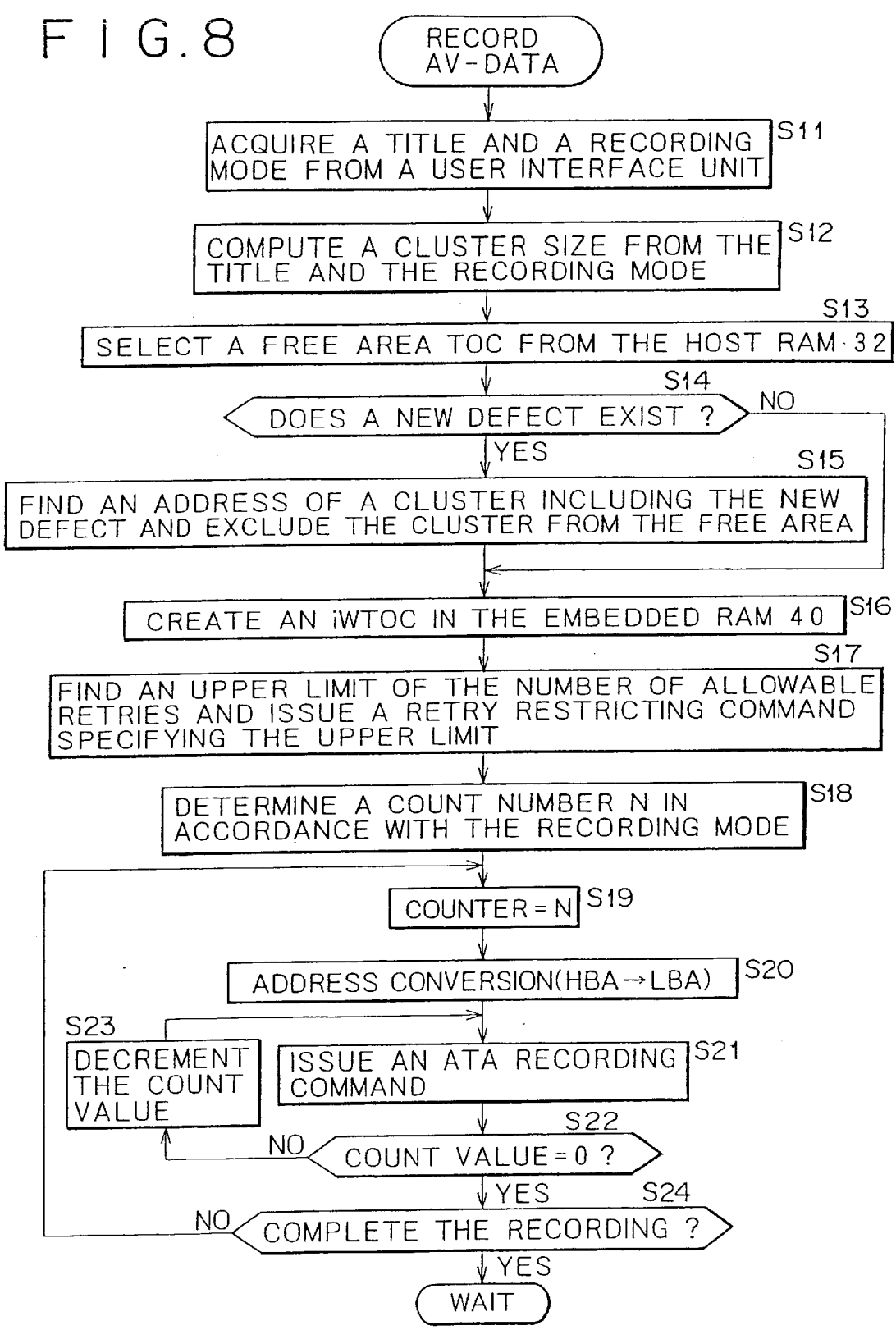
FIG. 8 shows a flowchart representing operations carried out by the host computer to record AV data.

The following description explains operations carried out by the host computer 2 to record AV data with reference to a flowchart shown in FIG. 8. As shown in the figure, the flowchart begins with a step S11 at which the MPU 31 acquires the title and a recording mode of AV data to be recorded from a user interface unit shown in none of the figures. The flow of the processing then goes on to a step S12 at which the MPU 31 acquires the number of recording channels represented by parameter n in formula (3) as well as a recording rate represented by parameter RMPEG in formula (3) from the title and the recording mode acquired at the step S11, and then computes the cluster size by using formula (3). The MPU 31 may also determine the cluster size using a lookup table containing values calculated from formula (3). It should be noted that the other parameters used in formula (3), namely, TSEEK, TREV, e and RDRV, are known values which are unique to the HDD 1.

Then, the flow of the processing goes on to a step S13 at which the MPU 31 selects TOC information on a free recording area on the disc from the 0TOC information stored in the host RAM 32. As described above, the 0TOC information has been created from the dTOC information stored in the HDD1 at the step S2 of the flowchart shown in FIG. 7.

Then, the flow of the processing goes on to a step S14 at which the MPU 31 forms a judgment as to whether or not a new defect exists in a blank area selected at the step S13. The formation of the judgment is based on the new-defect table created at the step S3 of the flowchart shown in FIG. 7 and stored in the host RAM 32. If the outcome of the judgment indicates that a new defect exists, the flow of the processing goes on to a step S15. At the step S15, the MPU 31 identifies the address of a cluster that includes the new defect and excludes the cluster from the blank area. If the outcome of the judgment indicates that a new defect does not exist, on the other hand, the flow of the processing goes on to a step S16 directly, skipping the step S15. At the step S16, the MPU 31 writes data for the blank area at a predetermined address in the embedded RAM 40 and creates iWTOC information. That is to say, TOC information in the embedded RAM 40 is used as iTOC information, iTOC information at recording is used as iWTOC information and iTOC information at playback is used as iRTOC information.

The flow of the processing then goes on to a step S17 at which the MPU 31 acquires the number of recording channels represented by parameter n in formula (6) as well as a recording rate represented by parameter RMPEG in formula (6) from the title and the recording mode acquired at the step S11, and then acquires the cluster size in formula (6) which was computed at the step S12. Then, the MPU 31 computes NRTRY, the number of allowable retries, by using formula (6). The MPU 31 may also determine the NRTRY using a lookup table containing values calculated from formula (6). It should be noted that the other parameters used in formula (6), namely, TSEEK, TREV, e and RDRV, are known values which are unique to the HDD 1. The MPU 31 informs the HDD 1 of the value of NRTRY so that the HDD 1 will not carry out retry operations a number of times exceeding the value of NRTRY.

In the HDD 1 to which the present invention is applied, an upper limit of the number of allowable retries is received from the host computer 2 as a command. Typically, in the ATA system, this command is defined newly as a special command. The host computer 2 issues a retry restricting command specifying an upper limit of the number of allowable retries to the HDD 1. When the number of retries carried out in an operation to read out or write data from or into the disc has reached the upper limit in the event of an error, the HDD 1 transmits data including the error occurred in the sector to the host computer 2. At the same time, the HDD 1 sets error status to interrupt the host computer 2. From this interruption, the host computer is informed of a defect address.

The flow of the processing then goes on to a step S18 at which the MPU 31 finds the number of times (N) a record command is to be issued. The value of N varies in dependence on the recording mode of a title to be recorded. The recording mode determines how many bytes can be recorded with one record command. For example, in the case of the edit mode set as a recording mode, the value of N is 3 since the size of the data is more than two times the amount of data that can be recorded in each record command. The flow of the processing then goes on to a step S19 at which the MPU 31 sets the count value of N found at the step S18 in a record-command-issuance counter.

The flow of the processing then goes on to a step S20 at which the MPU 31 converts an HBA (Host Block Address) into an LBA. An HBA is an address for controlling the AV-data recording area in the host computer 2. The flow of the processing then goes on to a step S21 at which the MPU 31 issues a record command to the HDD 1 through the data bus 37 and the ATA I/F 38. The record command requests the HDD 1 to record the title which was acquired at the step S11 from the user interface unit. The record command is issued on the basis of the iWTOC information stored in the embedded RAM 40. To be more specific, a cluster into which data can be recorded is selected as a recording location from the TOC information on a blank area which is part of the iWTOC information.

The flow of the processing then goes on to a step S22 at which the MPU 31 forms a judgment as to whether or not the count value of the record-command-issuance counter is equal to 0. If the outcome of the judgment formed at the step S22 indicates that the count value of the record-command-issuance counter is not equal to 0, the flow of the processing goes on to a step S23 at which the MPU 31 decrements the value of the record-command-issuance counter set at the step S19 by 1. Then, the flow of the processing goes back to the step S21 at which the MPU 31 issues another record command to the HDD 1.

If the outcome of the judgment formed at the step S22 indicates that the count value of the record-command-issuance counter has become equal to 0 or the recording command has been issued (N+1) times, on the other hand, the flow of the processing goes on to a step S24. At the step S24, the MPU 31 forms a judgment as to whether or not the operation to record the title acquired at the step S11 to be completed. If the MPU 31 judges that the operation to record the title is not to be completed, the flow of the processing goes back to the step S19 at which the value of N is set in the record-command-issuance counter for recording data into the next cluster. Then, the pieces of processing of the steps S20 to S24 are repeated. As the outcome of the judgment formed at the step S24 indicates that the operation to record the title is completed, the host computer 2 is put in a wait state.

Figure 9:
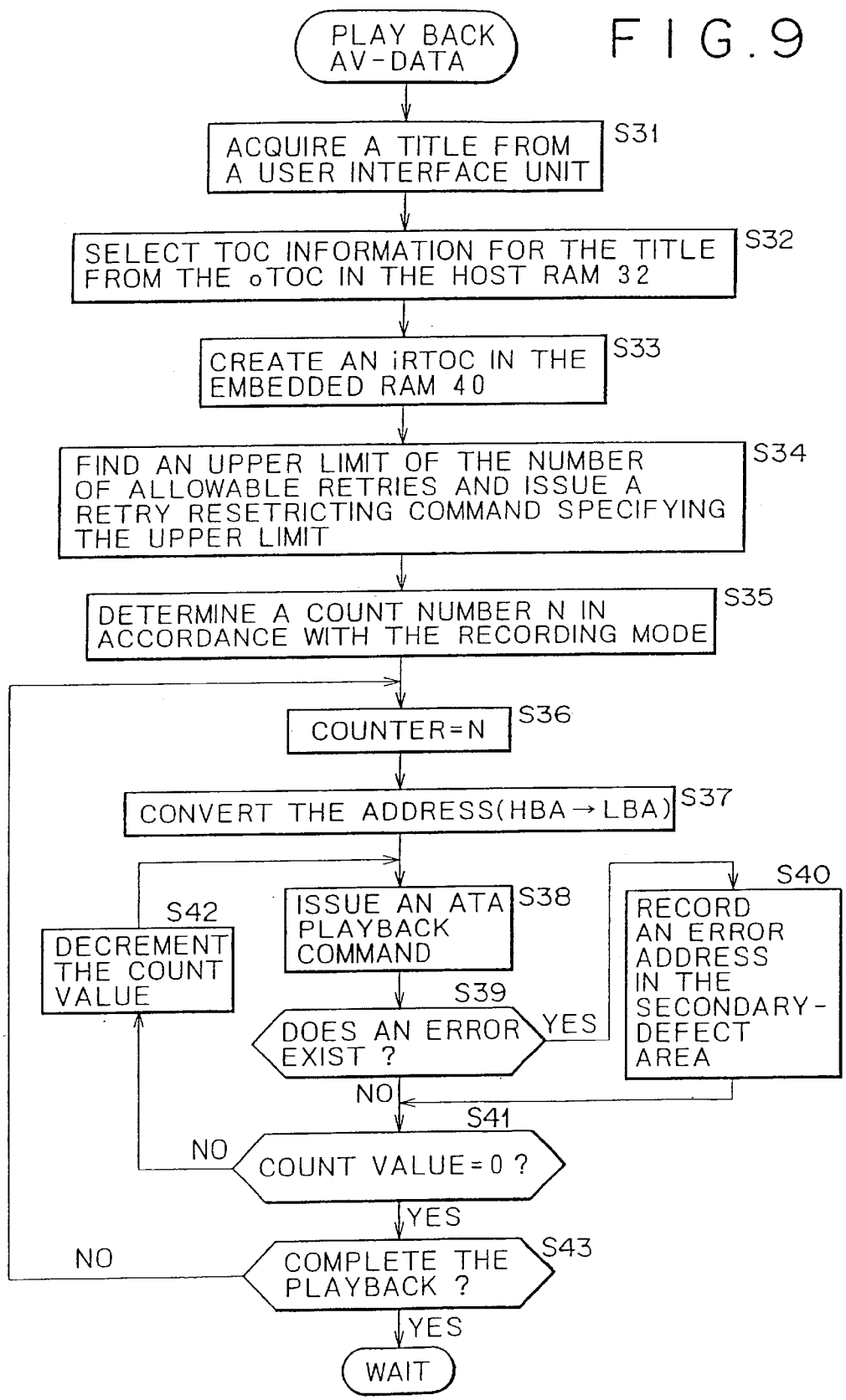
FIG. 9 shows a flowchart representing operations carried out by the host computer to play back AV data.

Next, operations carried out by the host computer 2 to play back AV data are explained by referring to a flowchart shown in FIG. 9. As shown in the figure, the flowchart begins with a step S31 at which the MPU 31 acquires the title of AV data to be played back from the user interface unit which is shown in none of the figures. The flow of the processing then goes on to a step S32 at which the MPU 31 selects information on a TOC area according to the title from the 0TOC information stored in the host RAM 32. As described earlier, the 0TOC information was created from the dTOC information recorded in the HDD 1 at the step S2 of the flowchart shown in FIG. 7. The flow of the processing then goes on to a step S33 at which the MPU 31 writes the 0TOC information selected at the step S32 at a predetermined address in the embedded RAM 40 in the MPU 31 to create iRTOC information.

The flow of the processing then goes on to a step S34 at which the MPU 31 acquires the number of playback channels represented by parameter n in formula (6), a playback rate represented by parameter RMPEG in formula (6) and the size of a cluster in which the data is recorded (that is, the parameter Cluster in formula (6)) from the recording mode of the title to be played back. Then, the MPU 31 computes NRTRY, the number of allowable retries, by using formula (6) and issues the retry restriction command to HDD 1. It should be noted that the other parameters used in formula (6), namely, TSEEK, TREV, e and RDRV, are known values which are unique to the HDD 1. Then, the flow of the processing goes on to a step S35 at which the MPU 31 finds the number of times (N) a playback command is to be issued in dependence on the recording mode (or the size of the cluster) of the title to be played back. The flow of the processing then goes on to a step S36 at which the MPU 31 sets the count value of N found at the step S35 in a playback-command-issuance counter.

The flow of the processing then goes on to a step S37 at which the MPU 31 converts an HBA (Host Block Address) for controlling the AV-data recording area in the host computer 2 into an LBA. The flow of the processing then goes on to a step S38 at which the MPU 31 issues a playback command to the HDD 1 through the data bus 37 and the ATA I/F 38. The playback command requests the HDD 1 to play back the title which was acquired at the step S31 from the user interface unit.

The flow of the processing then goes on to a step S39 at which the MPU 31 forms a judgment as to whether or not an error exists in the playback AV data supplied by the HDD 1 through the ATA I/F 38. If the outcome of the judgment indicates that an error exists in the playback AV data, the flow or the processing proceeds to a step S40 at which the MPU 31 sets the cluster containing the playback AV data with an error detected at the step S39 as a new-defective recording area by cataloging the HBA of the defective cluster in the new-defect table stored in the embedded RAM 40.

The flow of the processing then goes on to a step S41. If the outcome of the judgment formed at the step S39 indicates that an error does not exist in the playback AV data, on the other hand, the flow of the processing proceeds to the step S41 directly, skipping the step S40. At the step S41, the MPU 31 forms a judgment as to whether or not the count value of the playback-command-issuance counter set at the step S36 is equal to 0. If the outcome of the judgment formed at the step S41 indicates that the count value of the playback-command-issuance counter is not equal to 0, the flow of the processing goes on to a step S42 at which the MPU 31 decrements the count value of the record-command-issuance counter by 1. Then, the flow of the processing then goes back to the step S38 at which the MPU 31 issues another playback command to the HDD 1.

If the outcome of the judgment formed at the step S41 indicates that the count value of the playback-command-issuance counter has reached equal to 0, that is, if the number of times the playback command is issued has reached (N+1), on the other hand, the flow of the processing goes on to a step S43. At the step S43, the MPU 31 forms a judgment as to whether or not the operation to play back the title acquired at the step S31 is to be completed. If the MPU 31 judges that the operation to play back the title is not to be completed, the flow of the processing goes back to the step S36 at which the value of N is set in the playback-command-issuance counter for recording data into the next cluster. Then, the pieces of processing of the steps S37 to S43 are repeated. As the outcome of the judgment formed at the step S43 indicates that the operation to record the title is completed, the host computer 2 is put in a wait state.

It should be noted that the restriction on the retry operations imposed at the step S17 of the flowchart shown in FIG. 8 or the step S34 of the flowchart shown in FIG. 9 can also be based on time instead of the number of retries.

In addition, data can be recorded into and read out from the IT recording area including the system-management area in LBA units by making accesses to the HDD 1 with no restriction on the number of retries. The defect processing is the ordinary defect processing implemented in the HDD 1. The processing can be accessed at an error rate assured by an ordinary HDD.

It should be noted that, presentation media for presenting a computer program to be executed for carrying the processing described above can be information recording media such as a magnetic disc and a CD-ROM or transmission media using a network such as the Internet and a digital satellite.

As described above, according to a recording/playback apparatus, a recording/playback method and a presentation medium of the present invention, a defect in a data recording area of a recording medium causing an operation to record or play back data into or from the area to end in a failure is determined by counting the number of times an operation to record or play back data into or from the area ends in a failure, and an upper limit of the number of times used as a criterion for determining a defect is adjusted in accordance with the size of a unit of the operation to record or play back data into or from the recording medium. As a result, data can be recorded and played back without losing the continuity of the data.

In addition, according to a recording/playback apparatus, a recording/playback method and a presentation medium of the present invention, a defect in a data recording area of a recording medium causing an operation to record or play back data into or from the area to end in a failure is determined by counting the number of times an operation to record or play back data into or from the area ends in a failure, and an upper limit of the number of times used as a criterion for determining a defect is adjusted in accordance with a transfer rate and the number of transfer channels in the operation to record or play back data into or from the recording medium. As a result, data can be recorded and played back without losing the continuity of the data.

Having now fully described the invention, it will be apparent to one of ordinary skill in the art that many changes and modifications can be made thereto without departing from the spirit and scope of the invention as set forth herein.

What is claimed is:

1. Apparatus for recording continuous data on a recording medium, comprising:
   supplying means for supplying said continuous data of one or more channels at a predetermined transfer rate;
   recording means having a predetermined seek time and recording modes for recording said continuous data on said recording medium in a recording unit of controllable size;
   first setting means for setting the size of said recording unit according to said transfer rate of said supplied continuous data; and
   computing means for computing an upper limit for a number of allowable retries for recording said continuous data on said recording medium that are carried out in the event of a detected error during said recording modes, from at least a type of continuous data and said one or more channels.

2. An apparatus according to claim 1, wherein said first setting means sets the size of said recording unit according to said seek time of said recording means.

3. An apparatus according to claim 2, wherein said supplying means includes a designating means for designating said transfer rate according to recording mode.

4. An apparatus according to claim 2, wherein said first setting means includes a means for setting said recording unit size according to the recording mode.

5. An apparatus according to claim 2, wherein said computing means computes an upper limit of said number of allowable retries to play back data from said recording medium according to said transfer rate.

6. An apparatus according to claim 2, wherein said computing means computes an upper limit of the number of allowable retries to play back data from said recording medium according to said seek time.

7. An apparatus according to claim 2, wherein said computing means computes an upper limit of the number of allowable retries to play back data from said recording medium according to said recording unit size.

8. A method for recording continuous data on a recording medium, comprising the steps of:
   supplying said continuous data of one or more channels at a predetermined transfer rate;
   recording said continuous data on said recording medium in a recording unit of controllable size, using a recording means having a predetermined seek time and recording modes;
   setting the size of said recording unit according to said transfer rate of said supplied continuous data; and
   computing an upper limit for a number of allowable retries for recording said continuous data on said recording medium that are carried out in the event of a detected error during said recording modes, from at least a type of continuous data and said one or more channels.

9. A method according to claim 8, wherein said step of setting sets the size of said recording unit according to said seek time of said recording means.

10. A method according to claim 9, and further comprising the step of designating said transfer rate according to the recording mode.

11. A method according to claim 9, and further comprising the step of setting said recording unit size according to the recording mode.

12. A method according to claim 9, and further comprising the step of setting the number of allowable retries to play back data from said recording medium according to said transfer rate.

13. A method according to claim 9, and further comprising the step of setting the number of allowable retries to play back data from said recording medium according to said seek time.

14. A method according to claim 9, and further comprising the step of setting the number of allowable retries to play back data from said recording medium according to said recording unit size.

15. An apparatus for recording continuous data on a recording medium, comprising:
- supplying means for supplying said continuous data of one or more channels;
- first setting means for setting size of a recording unit;
- second setting means for setting the number of allowable retries to play back data from said recording medium according to said recording unit size;
- recording means having a predetermined seek time and recording modes for recording said continuous data on said recording medium in said recording unit; and
- computing means for computing an upper limit for a number of allowable retries for recording said continuous data on said recording medium that are carried out in the event of a detected error during said recording modes, from at least a type of continuous data and said one or more channels.

16. An apparatus according to claim 15, wherein said first setting means includes means for setting said recording unit size according to the seek time.

17. An apparatus according to claim 15, wherein said first setting means including means for setting said recording unit size according to recording mode.

18. A method for recording continuous data on a recording medium, comprising the steps of:
- supplying said continuous data of one or more channels;
- setting size of a recording unit;
- setting the number of allowable retries to play back data from said recording medium according to said recording unit size;
- recording said continuous data on said recording medium in said recording unit using a recording means having a predetermined seek time and recording modes; and
- computing an upper limit for a number of allowable retries for recording said continuous data on said recording medium that are carried out in the event of a detected error during said recording mode, from at least a type of continuous data and said one or more channels.

19. A method according to claim 18, and further comprising the step of setting said recording unit size according to the recording mode.

20. A method according to claim 18, and further comprising the step of setting said recording unit size according to the seek time.

21. An apparatus for reproducing continuous data of one or more channels, recorded with a predetermined unit size and in accordance with a selected recording mode and a predetermined transfer rate from a recording medium, comprising:
- setting means for setting the number of allowable retries to play back data from said recording medium according to recording unit size;
- reproducing means for reproducing said continuous data in accordance with the recording unit size; and
- computing means for computing an upper limit for a number of allowable retries for reproducing said continuous data from said recording medium that are carried out in the event of a detected error during said reproducing, from at least a type of continuous data and said one or more channels.

22. An apparatus according to claim 21, wherein said setting means includes means for setting the number of allowable retries according to the transfer rate.

23. An apparatus according to claim 21, wherein said recording unit size is set according to the recording mode.

24. A method for reproducing continuous data of one or more channels, recorded with a predetermined unit size and in accordance with a selected recording mode and a predetermined transfer rate from a recording medium, comprising the steps of:
- setting the number of allowable retries to play back data from said recording medium according to recording unit size;
- reproducing said continuous data in accordance with the recording unit size; and
- computing an upper limit for a number of allowable retries for reproducing said continuous data on said recording medium that are carried out in the event of a detected error during said reproducing, from at least the type of continuous data and said one or more channels.

25. A method according to claim 24, and further including the step of setting the number of allowable retries according to the transfer rate.

26. A method according to claim 24, and further including the step of setting said recording unit size according to recording mode.

27. A recording medium for recording continuous data of one or more channels, using a recording means having a predetermined seek time and recording modes for recording said continuous data at a predetermined transfer rate, comprising:
- a control region for storing management information, and
- a data region for storing said continuous data in recording units, said recording unit having a predetermined size in accordance with the transfer rate of said recorded continuous data; wherein
- in said control region an upper limit for a number of allowable retries is computed for recording said continuous data on said recording medium that are carried out in the event of a detected error during said recording modes, from at least a type of continuous data and said one or more channels.

28. An apparatus according to claim 27, wherein said recording unit has a predetermined size in accordance with the seek time of said recording means.

29. An apparatus according to claim 27, wherein said recording unit has a predetermined size in accordance with the recording mode.

* * * * *